United States Patent [19]

Neier

[11] 4,153,376
[45] May 8, 1979

[54] FEED MIXER APPARATUS

[76] Inventor: Benjamin R. Neier, 1211 13th St., Dodge City, Kans. 67801

[21] Appl. No.: 835,316

[22] Filed: Sep. 21, 1977

[51] Int. Cl.² .......................... A23N 17/00; B01F 7/08
[52] U.S. Cl. .................................... 366/298; 366/603; 137/625.23; 91/180
[58] Field of Search ................... 366/83, 99, 100, 292, 366/297, 301, 299, 318, 320, 321, 603, 298; 417/405; 91/180, 182, 186; 137/625.23, 625.24

[56] References Cited

U.S. PATENT DOCUMENTS

| | | | |
|---|---|---|---|
| 3,037,421 | 6/1962 | Bigelow et al. | 137/625.23 |
| 3,090,605 | 5/1963 | Copeland et al. | 366/298 |
| 3,129,644 | 4/1964 | Anderson | 91/180 |
| 3,217,744 | 11/1965 | Racicot | 137/625.23 |
| 3,706,442 | 12/1972 | Peat | 366/603 |

Primary Examiner—Harvey C. Hornsby
Assistant Examiner—Timothy F. Simone

[57] ABSTRACT

Improved feed mixer apparatus, wherein interconnected, auger mixing conveyors are operatively connected to a crank arm driven by a pair of pivotably mounted hydraulic cylinders which are in turn driven by a hydraulic power source providing for smooth and timed transition from low pressure to high pressure in the retraction and extension chambers thereof, thereby to avoid damage and/or excessive wear to the crank arm and/or cylinder components.

8 Claims, 8 Drawing Figures

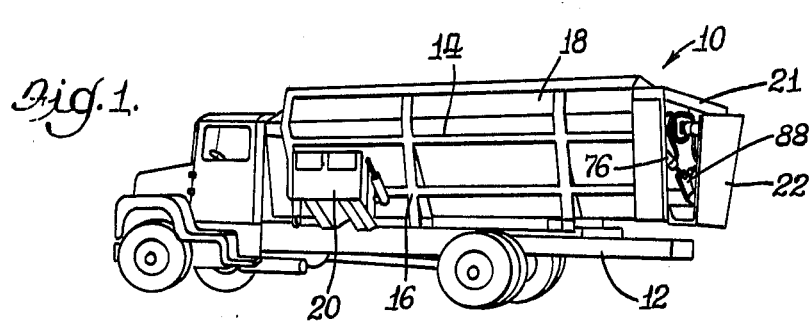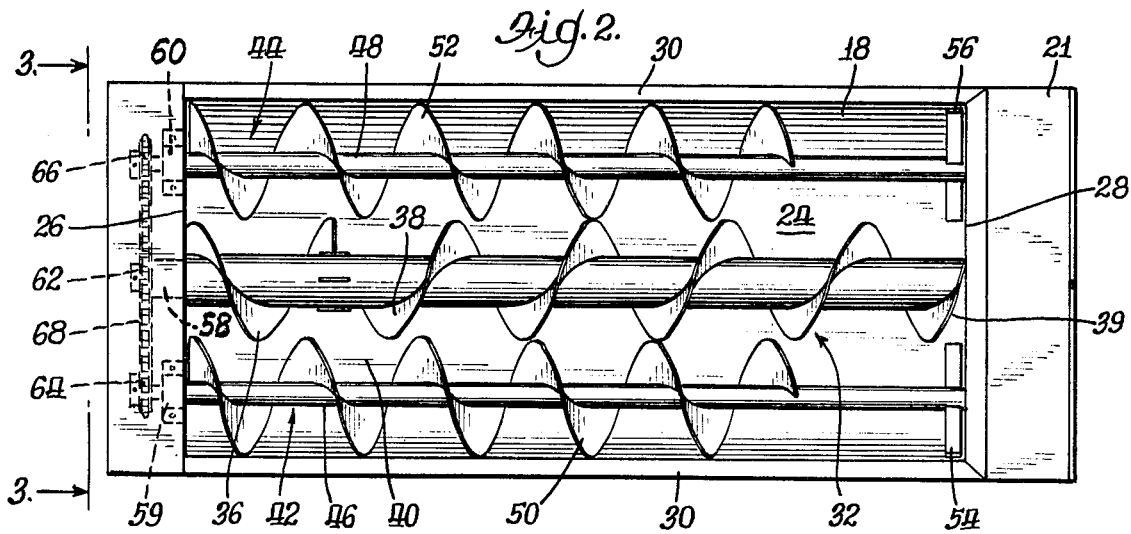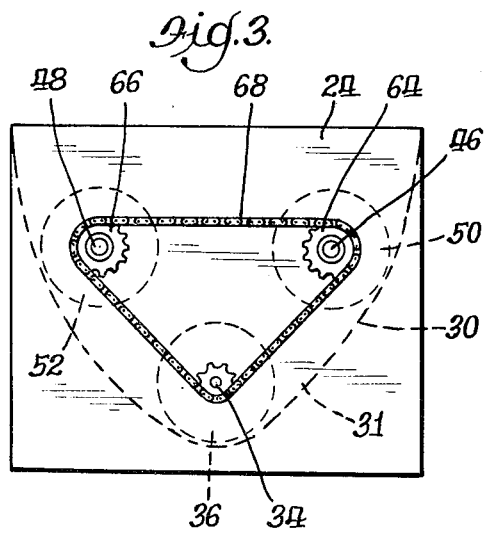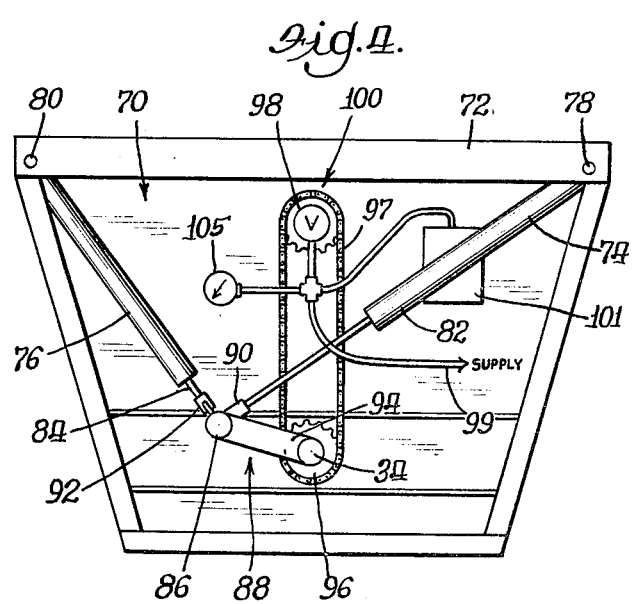

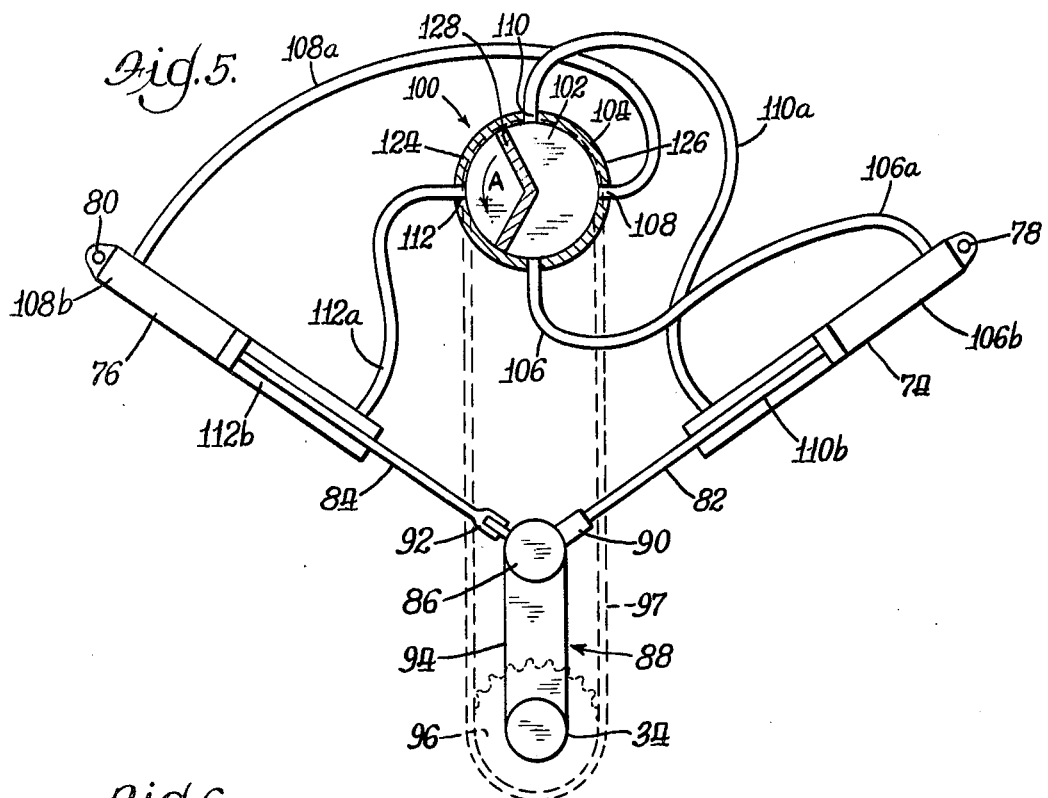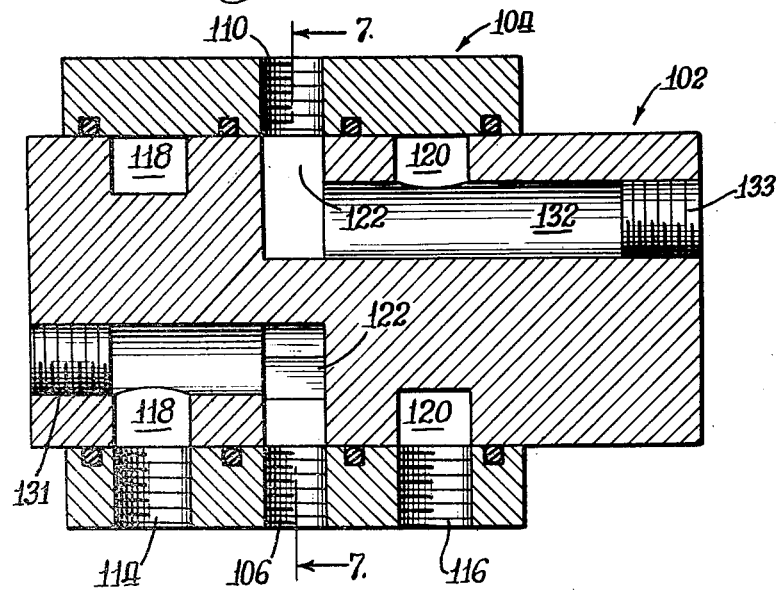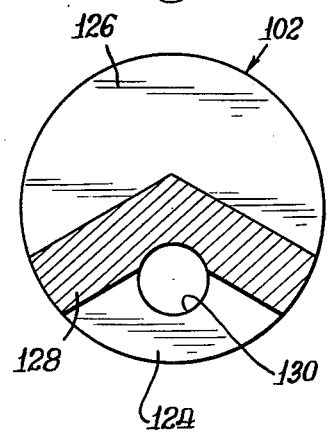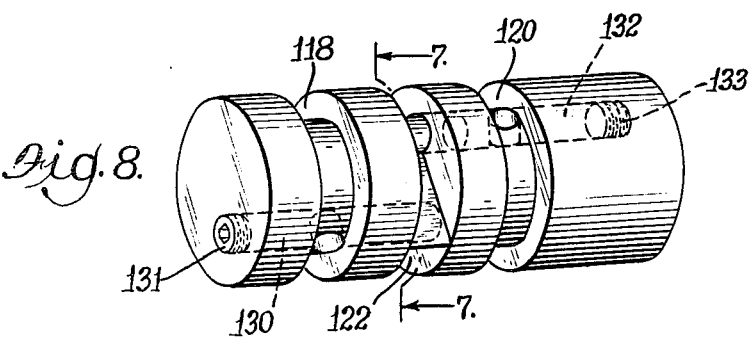

FEED MIXER APPARATUS

BACKGROUND OF THE INVENTION

The present invention relates generally to mixer apparatus and more particularily to an improved hydraulically powered mixer apparatus especially useful for the mixing of fluent materials such as animal feed.

Various devices are presently used for the mixing of animal feeds in feedlot, farming and ranching operations, in order to provide a controlled and nutritionally balanced diet to the animals for optimum weight gain, and thereby profit to the producer and saving to the consumer. One such apparatus which has found notable use and success is disclosed and claimed in U.S. Pat. No. 3,090,605, which patent is owned by the assignee hereof. That feed mixer apparatus has enjoyed such considerable success in the mixing of such materials as grain, food supplements, silage, molasses, and other animal feeds to produce therefrom a homogenous mix ready for dispensing for animal consumption, all within a reasonable time and at a reasonable cost to the meat producer both initially and in terms of maintenance costs.

That apparatus comprises a plurality of auger-like feed conveyors disposed in close and contoured relationship with the hopper wall, thereby to prevent packing of feed materials against the hopper wall. The feed conveyors thereof are provided with screw flights for channeling the mixed feed toward an area of mutual convergence, thereby to urge the feed mixture toward a feed dispenser apparatus disposed at one side of the hopper for ease of dispensing the feed into the feeding troughs. That apparatus may be mobile, whereby the mixing, conveying and feeding operation can be rendered yet more efficient and labor saving, further reducing costs.

Although that prior art feed mixer apparatus has found great commercial success, it has been desired to improve the apparatus to reduce further, the (albeit infrequent) maintenance required, and when required, to further reduce the cost of such maintenance. As the prior art device is driven by an internal combustion engine provided with a sprocket gear and chain drive, and that drive system was a component which did in time necessitate repair and/or maintenance, it has been desirable to develop a drive system which would materially alleviate those difficulties.

Accordingly, it is an object of the present invention to provide an improved feed mixer apparatus.

It is a further object of the improved feed mixer apparatus of the present invention to provide hydraulic drive means for a feed mixer providing efficiency both in manufacture and in use.

It is a yet further object of the improved feed mixer apparatus of the present invention to provide hydraulic drive means for a feed mixer with resultant savings in maintenance costs.

It is a yet further object of the improved feed mixer apparatus of the present invention to provide a hydraulic drive unit which is of compact shape and suitable for mounting upon a preferably mobile feed hopper without substantially increasing the length of the bed thereof.

It is an additional object of the improved feed mixer apparatus of the present invention to provide a synchronous drive between a valve rotor and a vertically disposed feed conveyor drive means.

It is also an object of the improved feed mixer apparatus of the present invention to provide a V-shaped barrier within the cylinder activation chamber of the valve rotor to define a high pressure chamber.

It is also a further object of the improved feed mixer apparatus of the present invention to provide delay means for timing the synchronous drive between the valve rotor and the crank arm to prevent high pressure drive to the extension chambers of the hydraulic cylinders while the crank arm is disposed in straight line relationship with a cylinder rod to prevent damage and/or excessive wear to the cylinder, the rod and/or the crank arm.

It is also yet a further object of the improved feed mixer apparatus of the present invention to provide means within the hydraulic valve assembly, whereby for an initial period two chambers of the hydraulic cylinders are simultaneously open to high pressure drive thereby allowing smooth transition from low pressure to high pressure within a chamber whereby damage and/or excessive wear to the cylinder, cylinder rod and crank arm may be prevented.

It is also an additional object of the improved feed mixer apparatus of the present invention to provide pressurized hydraulic fluid reservoir means to permit supplementary hydraulic fluid to the hydraulic system during periods in the valve rotor cycle when two cylinder chambers are simultaneously open to high pressure drive.

SUMMARY OF THE PRESENT INVENTION

The improved feed mixer apparatus of the present invention comprises a hopper for containing the feed materials to be mixed, in which hopper a plurality of interconnected auger-like feed mixing conveyors are disposed for churning the feed materials and for channeling the mixed feed materials to a discharge opening. The feed conveyors are driven by hydraulic means comprising a pair of double-acting cylinders, pivotably mounted at the non-working end thereof to a support frame borne by the hopper. The rods of the hydraulic cylinder are pivotably attached to a crank arm for rotationally driving by means of a crank arm one such auger-like conveyor and thereby each of the interconnected conveyors.

The hydraulic cylinders are actuated by the hydraulic drive means, which includes a hydraulic valve assembly. The hydraulic valve assembly is interconnected for synchronous rotational motion with the crank arm in a preferred embodiment. The synchronous connecting means preferably comprises a rotor sprocket gear mounted on a valve rotor for rotation therewith, a mixer sprocket gear mounted on one of the conveyor drive means and a sprocket chain connecting both sprockets for rotational drive transmission. Preferably, the valve assembly and synchronous connecting means are disposed in common vertical plane, so as not substantially to increase the overall length of the apparatus.

The hydraulic valve assembly perferably includes a cylindrical valve body having fluid input and output openings disposed at opposite ends thereof, and paired ports for each hydraulic cylinder disposed in radial opposition in a transverse plane at the central portion of the valve body preferably at 90° to each other. A valve rotor is disposed within the valve body and includes annularly continous radial fluid input and output grooves disposed at opposite ends thereof, and communicating respectively with fluid input and output openings of the valve body.

The rotor further includes a cylinder activation chamber disposed in the central portion thereof corresponding to the transverse plane of the valve body containing the radially disposed cylinder ports referred to hereinabove, such chamber communicating with such ports. The cylinder activiation chamber is divided into low and high pressure chambers by a barrier which is V-shaped in transverse in cross-section. The V-shaped barrier as defining the high pressure chamber preferably extends through an angle greater than 90° but less than 180°, and optimally 150°, whereby during rotation of the valve rotor temporary communication is maintained between the high pressure chamber and a first port during the initial period of communication between the high pressure chamber and the next successive port. The resulting function of that structure is to provide for a short initial time for each port simultaneous communication between the high pressure chamber and two such ports, thereby reducing the level of high pressure for such initial period, and to provide for smooth transition to high pressure communication.

An input communication bore connects the annular input groove and the high pressure chamber, and an output communication bore connects the annular output groove and the low pressure chamber, whereby the hydraulic fluid may flow forwardly and in reverse from the cylinder activation chamber to the hydraulic fluid source during operation. A pressurized hydraulic fluid reservoir may be preferably provided for communication with the input opening to permit an increase in the hydraulic fluid available to the system during periods when two ports are simultaneously in communication with the high pressure chamber.

The radially opposed, paired ports are connected to the cylinder chambers for successive operation in the following sequence: the extension chamber of the first cylinder; the extension chamber of the second cylinder, retraction chamber of the first cylinder, and the retraction chamber of the second cylinder, whereby the crank arm is driven radially a full 360°.

Various modifications of the improved feed mixer apparatus of the present invention are intended to be embodied and will become apparent to those skilled in the art from the teaching of the principles of the invention in connection with the disclosure of the specification, the claims and the drawing.

BRIEF DESCRIPTION OF THE DRAWING

FIG. 1 is a perspective view of the improved feed mixer apparatus of the present invention mounted on a truckbed for mobility, showing at the rear thereof a cylinder support frame borne by the hopper, and improved hydraulic means for driving the feed mixing conveyors enclosable within a compartment and showing an auger-driven dispenser means at the side thereof;

FIG. 2 is a plan view of the improved feed mixer apparatus showing the hopper, containing feed conveyors and at the front portion thereof gear and chain means for interconnecting the conveyors for drive by a common source, the central and bottom such conveyor having oppositely directed helical flights for channeling the mixed feed to an area of convergence in the hopper for discharge by the dispenser means shown in FIG. 1;

FIG. 3 is a cross-sectional view taken along lines 3—3 of FIG. 2, showing the sprocket gear and chain means for interconnecting the conveyors for drive by a common source;

FIG. 4 is a schematic end view of the improved feed mixer apparatus, showing the cylinder support frame borne by the hopper, the hydraulic cylinders pivotably attached to the cylinder support frame and driving a crank arm which is operatively connected to the central conveyor by mounting for rotationally driving the conveyor drive shaft, and also showing a sprocket gear interconnected by a sprocket chain with a sprocket gear mounted to the rotor of the hydraulic valve assembly; hydraulic supply means pressure gauge means, and a hydraulic fluid reservoir are all shown communicating with a hydraulic fluid input opening in such valve assembly;

FIG. 5 is an enlarged, partial sectional schematic end view of the improved feed mixer apparatus similar to that of FIG. 4, showing paired ports for the extension and retraction chambers of each hydraulic cylinder disposed in radial opposition and projecting from the valve body of the hydraulic valve assembly, hydraulic fluid conduits each communicating a valve body port with a hydraulic cylinder chamber, with the hydraulic valve assembly shown in section through the cylinder activation chamber and rotating in the direction shown by arrow A, such chamber divided into high and low pressure chambers by a V-shaped barrier;

FIG. 6 is an enlarged longitudinal cross-section of the hydraulic valve assembly, showing the cylindrical valve body fluid input and output openings at opposite ends thereof and paired ports disposed at a central portion thereof, the valve rotor disposed within the valve body and having continuous annular fluid input and output grooves at opposite ends thereof communicating with the fluid input and output openings of the valve body, and a cylinder activation chamber communicating with the ports, the valve rotor also having input and output communication bores for connecting the cylinder activation chamber with the input and output openings respectively of the valve body;

FIG. 7 is a schematic cross-sectional view taken along 7—7 of FIGS. 6 and 8, showing the V-shaped barrier separating the cylinder activation chamber into high and low pressure chambers; and FIG. 8 is a perspective view of the valve rotor, showing annularly continuous radial fluid input and output grooves at opposite ends thereof for communicating with the fluid input and output openings of the valve body, and a cylinder activation chamber for communicating with the ports, also showing (in dotted lines) the input and output communication bores for connecting the cylinder activation chamber with the input and output openings of the valve body for imparting high and low pressure respectively to the cylinder chambers.

DETAILED DESCRIPTION OF THE PREFERRED EMBODIMENTS

Referring now to the drawing, FIG. 1 shows the improved feed mixer apparatus of the present invention generally designated at 10 mounted on a truckbed 12 for mobility, and including horizontal and vertical reinforcing ribs 14, 16, for the trough-shaped hopper 18 and further including a hydraulically driven dispensing apparatus 20. At the rear of truckbed 12 is mounted a compartment 21 enclosable by doors 22 for containing the hydraulic means for driving the feed mixer conveyors, the details of which are set forth hereinbelow.

Referring now to FIGS. 2 and 3, hopper 18 for receiving the feed materials to be mixed is open at the top portion 24 thereof and includes vertical front and rear walls 26, 28 joined by side walls 30 sloping downwardly to form a trough 31. A centrally disposed feed conveyor 32 is rotatably mounted between front and rear walls 26, 28 at a bottom portion thereof and includes a horizontally extending shaft 34 mounted for rotation in trough 31. Upon central shaft 34 a first continuous helical flight 36 is secured thereto and terminates at one end of shaft 34 adjacent front wall 26 of hopper 18. Flight 36 is in the form of a right-handed helix which is defined herein as advancing into a hypothetical receiver when turned clockwise.

Spaced apart from such first flight 36 is a second helical flight 38, which is of the same pitch, but is left-handed. Second helical flight 38 has an end portion 39 terminating at rear wall 28 of hopper 18. Thus, first and second helical flights 36, 38 function to direct mixing feed toward a converging area 40 for dispensing by means of dispensing apparatus 20. Operatively connected to central feed conveyor 32 are two feed conveyors 42, 44 disposed above and on either side of central conveyor 32, each having shafts 46, 48 extending from front wall 26 to rear wall 28 of hopper 18. Each of the side conveyors 42, 44 has a right-handed continuous helical flight 50, 52 for directing the mixing feed toward rear wall 28 of hopper 18, where the feed is collected and conveyed forwardly by central conveyor 32 thereby to provide for completeness of mixing. Agitator paddles 54, 56 are secured to shafts 46, 48 adjacent rear wall 28 to prevent feed materials from packing thereagainst during mixing. Opposite front wall 26 and outside hopper 18 each of shafts 34, 46, 48 is supported by a ball bearing support means 58, 59, 60 respectively for rotation.

Shafts 34, 46, 48 are interconnected, as shown in FIG. 3, by means of respective sprocket gears 62, 64, 66 and sprocket chain 68, such that two side conveyors 42, 44 may be driven from a common source driving central conveyor 32.

Referring now to FIGS. 4 and 5, which set forth schematically the details of the hydraulic drive means generally designated as 70, cylinder support frame 72 is borne by hopper 18. First and second hydraulic cylinders 74, 76 are attached at pivots 78, 80 at a top portion thereof. First and second hydraulic cylinders 74, 76 are double-acting as may be seen in FIG. 5, each having respectively a cylinder rod 82, 84 which is attached at one end 86 of crank arm 88 by rod pivots 90, 92 for circular drive thereof. Crank arm 88 is attached at a second end 94 thereof to shaft 34 of central conveyor 32 for rotationally driving it and consequently each of side conveyors 42, 44.

A sprocket gear 96 is fixedly mounted on shaft 34 and is connected by sprocket chain 97 to a second sprocket gear 98 vertically disposed therefrom on the rotor of the hydraulic valve assembly generally designated as 100. Hydraulic valve assembly 100 is supplied with an input of hydraulic fluid under pressure through hydraulic input line 99, which has communicating therewith a pressurized hydraulic fluid reservoir 101 by means of reservoir line 103, and further preferably has a pressure gauge 105 communicating therewith.

Referring now to FIGS. 5-8, which set forth in greater detail the structure and operation of hydraulic valve assembly 100 in conjunction with cylinders 74, 76. Hydraulic valve assembly 100 comprises a valve rotor 102 disposed within a valve body 104. Valve body 104 has paired ports 106, 108, 110, 112 therein disposed in radial opposition in a transverse plane at a central portion thereof, and preferably at 90° to each adjacent port, each of which is connected to an associated cylinder compartment supply line 106a, 108a, 110a, 112a. Supply lines 106a, 108a, 110a, 112a respectively supply hydraulic fluid to the extension compartment 106b of first cylinder 74, extension compartment 108b of second cylinder 76, retraction compartment 110b of first cylinder 74, and retraction compartment 112b of second cylinder 76. As shown in FIG. 6, valve body 104 also includes hydraulic fluid input and output openings 114, 116 disposed at opposite ends thereof.

Valve rotor 102 has annularly continuous fluid input and output grooves 118, 120 disposed at opposite ends thereof for fluid communication respectively with hydraulic fluid input and output openings 114, 116 of valve body 104. Valve rotor 102 also includes a cylinder activation chamber 122 disposed at a central portion thereof for communication with and corresponding to the transverse plane through valve body 104 containing radially disposed cylinder ports 106, 108, 110, 112. Cylinder activation chamber 122 is divided into high and low pressure chambers 124, 126 by barrier 128 which is V-shaped in transverse cross-section and which may extend through an angle of less than 180° but greater than 90°, and preferably 150°. Valve rotor 102 further includes a longitudinally extending input communication bore 130 for providing communication of hydraulic fluid between annular fluid input groove 118 and high pressure chamber 124, and a longitudinally extending output communication bore 132 for providing communication between annular fluid output groove 120 and low pressure chamber 126. Bores 130, 132 may be formed in rotor 102 by drilling and closed at the terminal ends thereof by caps 131, 133.

In operation, hydraulic fluid flows under pressure from a source such as a pump (not shown), through input opening 114 into annular input groove 118 for communication through input communication bore 130 into high pressure chamber 124 for pumping through a radially disposed valve body port to a chamber of a cylinder. As rotor 102 turns, the respective ports 106, 108, 110, 112 are opened to high pressure chamber 124, in sequence activating extension chamber 106b of first cylinder 74, extension chamber 108b of first cylinder 74, retraction chamber 110b of second cylinder 76, and retraction chamber 112b. The result of such extensions and retractions of cylinder rods 82, 84 is to drive crank arm 88 in a circular path to rotationally drive the interconnected feed mixer conveyors 32, 42, 44. Synchronism is maintained between rotor 102 and the driven central conveyor shaft 34 by means of respective sprocket gears 96, 98 and connecting sprocket chain 97.

As V-shaped barrier 128 defining high pressure chamber 124 extends through preferably approximately 150°, for a brief period after high pressure communication is initiated with respect to a given cylinder chamber high pressure communication is simultaneously maintained with the immediately prior driven cylinder chamber, providing a division of the high pressure hydraulic fluid available to the system which results in a smooth transition from low pressure to high pressure within a given chamber. To prevent insufficient hydraulic fluid during such periods hydraulic fluid is made available from pressurized hydraulic fluid reservoir 101 by means of reservoir line 103.

The synchronous timing between rotor 102 and the driven central conveyor shaft 34 and its driving crank arm 88 may be provided by adjusting the rotary position of rotor 102 within valve body 104 whereby full high pressure is not imparted to a cylinder while its cylinder rod is in straight line disposition relative to crank arm 88, thereby preventing damage and/or excessive wear to the system.

While cylinder compartment(s) are being driven by high pressure hydraulic fluid flowing away from rotor 102, the other cylinder compartments, which are open to low pressure chamber 126, provide a flow of low pressure hydraulic fluid toward and through rotor 102. Such low pressure fluid flows from a valve body port into low pressure chamber 126 for communication through output bore 132 into output annular groove 120 for exit through output opening 116 of rotor 102 and for returning the hydraulic fluid to the hydraulic fluid source (not shown).

The particular dimensions and/or size of the above described components, except as stated, are not critical to the invention and may vary widely. However, such dimensions and/or size should be sufficient to accomodate complete mixing of a sizable quantity of feed material within an economical period of time. Materials, such as steel, which are of considerable strength and which are capable of being fabricated to the required degree of functional tolerance are preferably used for reliability of operation and lessened frequency of maintenance.

The basic and novel characteristics of the improved feed mixer apparatus of the present invention and the advantages thereof will be readily understood from the foregoing disclosure by those skilled in the art. It will become readily apparent that various changes and modifications may be made in the form, construction and arrangement of the combination apparatus set forth hereinabove without departing from the spirit and scope of the invention. Accordingly, the preferred and alternative embodiments of the present invention set forth hereinabove are not intended to limit such spirit and scope in any way.

What is claimed is:

1. In a feed mixer apparatus having hopper means for containing feed materials to be mixed, a plurality of mixing conveyor means disposed in said hopper means for churning the feed materials, and conveyor drive means operatively connected to at least one said conveyor means for driving said plurality of conveyor means, the improvement of hydraulic means for driving said conveyor means, said hydraulic drive means comprising:

a hydraulic drive output shaft operatively connected to the conveyor means to provide rotational motion thereto;
   a cylinder support frame borne by the hopper;
   a pair of hydraulic cylinders each having a proximal extension compartment and a distal retraction compartment, each of which is pivotably secured at the proximal end thereof to said cylinder support frame, and each of which has a cylinder rod operatively projecting from the distal end of each said cylinder;
   a common crank arm secured to one of the mixing conveyor means for rotationally driving the mixing conveyor means;
   rod securement means for pivotably attaching each of said cylinder rods at the distal end thereof to said common crank arm for rotationally driving said common crank arm, thereby to drive the mixing conveyor means for churning the feed material within the hopper;
   hydraulic motor means operatively connected to said extension and retraction chambers of said hydraulic cylinders for driving said cylinders, said hydraulic motor means having a hydraulic valve assembly, said hydraulic valve assembly including:
      a cylindrical valve body having fluid input and output openings disposed at opposite ends thereof, and paired ports for each hydraulic cylinder disposed in radial opposition in a single transverse plane at a central portion of said valve body; and
      a valve rotor disposed within said valve body, said rotor having therein annularly continuous fluid input and output grooves disposed at opposite ends thereof, said annular grooves continuously communicating with the fluid input and output openings of said valve body respectively,
      said rotor having a cylinder activation portion disposed at the central portion thereof corresponding to the transverse plane through the valve body containing said radially disposed cylinder ports,
      said cylinder activation portion divided into a single high pressure chamber and a single low pressure chamber by a barrier which is v-shaped in transverse cross section, said v-shaped barrier extending radially through an angle of greater than 90° but less than 180°, whereby during rotation of said valve rotor said v-shaped barrier opens a first port to communication with said high pressure chamber and simultaneously the remaining three ports to communication with said low pressure chamber,
      said valve rotor having a longitudinally extending input communication bore connecting said annular input groove and said single high pressure chamber, and having a longitudinally extending output communication bore connecting said annular output groove and said single low pressure chamber, whereby within a given chamber during periods of high pressure and during periods of low pressure hydraulic fluid may respectively flow from and return to the hydraulic fluid source; and
   synchronous connecting means for interconnecting and driving said hydraulic valve rotor synchronously with said common crank arm means and thereby synchronizing the operation of said cylinder rods to effect by mechanical feed back smooth rotational drive of the conveyor means by said crank arm.

2. The improved feed mixer of claim 1 wherein said belt means comprises a linked sprocket chain.

3. The improved feed mixer of claim 1 wherein said port openings for each hydraulic cylinder are disposed at 90° to each other.

4. The improved feed mixer of claim 1 wherein the longitudinal axes of said input bore and said output bore are disposed in transverse perspective at 180° to each other.

5. The improved feed mixer apparatus as claimed in claim 1 further comprising a pressurized hydraulic fluid reservoir communicating with said input opening.

6. The improved feed mixer apparatus of claim 1 further comprising pressure indicator means communicating with said input opening.

7. The improved feed mixer apparatus as claimed in claim 1 wherein said radially opposed, paired ports are disposed for sequential cyclical operation of the extension chamber of a first cylinder, the extension chamber of the second cylinder, the retraction chamber of the first cylinder and the retraction chamber of the second cylinder.

8. The improved feed mixer apparatus as claimed in claim 1 further comprising mobility means for said hopper for transportation.

* * * * *